United States Patent Office 3,388,099
Patented June 11, 1968

3,388,099
TERPOLYAMIDES
James S. Ridgway, Durham, N.C., assignor to Monsanto Company, St. Louis, Mo., a corporation of Delaware
No Drawing. Continuation-in-part of application Ser. No. 455,960, May 14, 1965. This application June 7, 1965, Ser. No. 462,057
8 Claims. (Cl. 260—47)

ABSTRACT OF THE DISCLOSURE

The invention provides novel terpolyamides made by interpolymerizing hexamethylenediammonium adipate, hexamethylenediammonium terephthalate and hexamethylenediammonium m-phenylenedioxydiacetate or cyclohexanebis (methylammonium) m-phenylenedioxydiacetate. These terpolyamides are useful in the production of fibers which have a high boiling water shrinkage value.

---

This invention is a continuation-in-part of my copending application S.N. 455,960, filed May 14, 1965, now abandoned.

This invention relates to novel synthetic linear fiber-forming terpolymers. More particularly, this invention relates to novel synthetic linear fiber-forming terpolyamides, to the process for producing them and to fibers made therefrom.

Polyamides, such as polyhexamethylene adipamide (nylon 66) and polycaproamide (nylon 6) are well known in the art and have found significant commercial success as textile fibers. Although the textile fibers obtained from the previously known fiber-forming polyamides heretofore known are of great value, much research effort is being continuously expended in order to improve their properties. For example, these previously known polyamides all possess a relatively low shrinkage value, that is, the amount of shrinkage that occurs in fibers made from these polyamides when they are treated with boiling water is relatively small. In some commercial uses, for example, as hosiery, it is desirable that the polyamide textile fibers have increased shrinkage. Furthermore, in the production of conjugate fibers, that is, a fiber having two or more components, it is extremely desirable that at least one of the components have a relatively high boiling water shrinkage. This is necessary in order that the crimp in a conjugate fiber be significant and permanent.

It is an object of this invention to provide a novel terpolyamide.

It is a further object of this invention to provide a novel synthetic linear fiber-forming terpolyamide which has increased boiling water shrinkage characteristics.

It is a still further object of this invention to provide a textile fiber composed of this novel synthetic linear fiber-forming terpolyamide.

It is a still further object of this invention to provide a process for producing a novel synthetic linear fiber-forming terpolyamide.

These and other objects will become apparent from the description given hereinafter.

The terpolyamides of the present invention are useful in the production of shaped articles by extrusion, molding or casting in the nature of yarns, fabrics, films, pellicles, bearings, ornaments or the like. They are particularly useful in the production of textile fibers.

The present invention provides a novel linear fiber-forming terpolyamide composed of (A) 1 to 98 mole percent, based on the molecular weight of the polyamide, of units represented by the structure

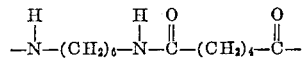

(B) 1 to 98 mole percent, based on the molecular weight of the terpolyamide, of units represented by the structure

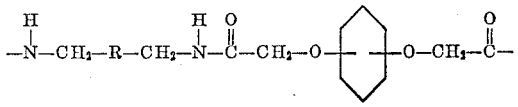

wherein R is a member selected from the group consisting of tetramethylene and 1,4-cyclohexylene, and (C) 1 to 50 mole percent, based on the molecular weight of the terpolyamide of units represented by the structure

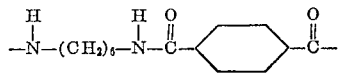

In a typical preparation the terpolyamide is formed by interpolymerizing (A) substantially equimolecular proportions of adipic acid and hexamethylene diamine, (B) substantially equimolecular proportions of phenylenedioxy diacetic acid and a diamine selected from the group consisting of hexamethylene diamine and 1,4-cyclohexanebis-(methylamine) and (C) substantially equimolecular proportions of terephthalic acid and hexamethylene diamine, wherein component (A) is present in an amount sufficient to provide 1 to 98, preferably 30 to 60 mole percent of the final terpolymer, component (B) is present in an amount sufficient to provide 1 to 98, preferably 10 to 50 mole percent of the final terpolymer and component (C) is present in an amount sufficient to provide 1 to 50, preferably 20 to 50 mole percent of the final terpolymer. It is, of course, obvious that the total mole percentage will not exceed 100 percent.

The terpolyamides of this invention are prepared by procedures well known in the art and commonly employed in the manufacture of simple polyamides. That is, the reactants are heated at a temperature of from 180° C. to 300° C. and preferably from 200° C. to 295° C. until the product has a sufficiently high molecular weight to exhibit fiber-forming properties, which properties are reached when the terpolyamide has an intrinsic viscosity of at least 0.4. The reaction can be conducted at super atmospheric, atmospheric, or subatmospheric pressure. Often it is desirable, especially in the last stage of the reaction, to employ conditions, e.g. reduced pressure, which will aid in the removal of the reaction by-products. Preferably the reaction is carried out in the absence of oxygen, for example, in an atmosphere of nitrogen.

Intrinsic viscosity as employed herein is defined as $$C \xrightarrow{\text{Lim}} 0 \left( \frac{\log_e N_r}{C} \right)$$

in which $N_r$ is the relative viscosity of a dilute solution of the polymer in m-cresol in the same units at the same temperature and C is the concentration of grams of polymer per 100 cc. of solution.

Instead of interpolymerizing the acid and amine amide-forming reactants referred to above, it is within the scope of this invention to interpolymerize the salts formed therefrom. Thus, the terpolyamides of the present invention may be formed by interpolymerizing (A) polyhexamethylenediammonium adipate, (B) either polyhexamethylenediammoniumphenylenedioxy diacetate or poly-1,4-cyclohexanbis-(methylammonium) phenylenedioxy diacetate and (C) polyhexamethylenediammonium terephthalate.

The amount of component (A) present in the terpolymers of the present invention ranges from 1 to 98, preferably 30 to 60 mole percent based on the molecular weight of the terpolymer. Component (B) is present in the terpolymer in an amount of from 1 to 98, preferably 10 to 50 mole percent based on the molecular weight of the terpolymer and component (C) is present in an amount of between 1 to 50, preferably 20 to 50 mole percent based on the molecular weight of the final terpolymer. It has been found that the terpolymer compositions thus prepared have a substantially increased boiling water shrinkage.

The phenylenedioxy diacetic acid which is employed as part of component (B) above may be either the ortho-, the meta- or the para-isomer. It is preferred however, to employ m-phenylenedioxy diacetic acid, both because of its commercial availability and because of the characteristics of the terpolyamide produced therefrom.

In order to illustrate the invention and the advantages thereof with greater particularity, the following specific examples are given. It is to be understood that they are intended to be only illustrative and not limitative. Parts are given by weight unless otherwise indicated.

Example I

A solution was prepared containing 81.5 parts (60 mole percent) of hexamethylenediammonium adipate, 38.1 parts (20 mole percent) of 1,4-cyclohexanbis-(methylammonium)-m-phenylenedioxy diacetate, and 29.2 parts (20 mole percent) of hexamethylenediammonium terephthalate dissolved in 85 parts of water. This solution was added to a stainless steel high pressure autoclave which had been previously purged of air by the use of purified nitrogen. The temperature and pressure were slowly raised to 243° C. and 250 p.s.i.g. respectively during which time there was the continuous removal of steam condensate. At this point the pressure was gradually reduced to atmospheric over a 25-minute period and the polymer melt was allowed to equilibrate for 30 minutes at 280° C. The polymer thus obtained at a melting point of approximately 239° C.

This finished polymer was melt spun directly from the autoclave through a single hole spinneret yielding a monofilament yarn possessing good textile properties.

Example II

A solution of 51.7 parts (40 mole percent) of equimolecular portions of hexamethylene diamine and adipic acid, 54.5 parts (30 mole percent) equimolecular portions of 1,4-cyclohexanbis-(methylamine) and m-phenylenedioxy diacetic acid, and 41.8 parts (30 mole percent) equimolecular portions of hexamethylene diamine and terephthalic acid dissolved in 54.1 parts of water was placed in a stainless steel high pressure autoclave which had been previously purged with nitrogen. Polymerization of this solution was brought about by the procedure as set forth in Example I. The resulting polymer had a melting point of approximately 232° C.

The finished polymer was melt spun directly from the autoclave to a single hole spinneret yielding a monofilament yarn having good textile properties.

Example III

A solution of 83.4 parts (60 mole percent) of hexamethylenediammonium adipate, 36.2 parts (20 mole percent) of hexamethylenediammonium-m-phenylenedioxy diacetate, and 29.8 parts (20 mole percent) of hexamethylenediammonium terephthalate dissolved in 87 parts of water was added to a stainless steel high pressure autoclave previously purged with nitrogen. The solution was polymerized by the procedure set forth in Example I. The polymer thus obtained had a melting point of approximately 239° C. and a monofilament yarn prepared therefrom exhibited good textile characteristics.

Example IV

A solution of 85.2 parts (60 mole percent) of hexamethylenediammonium adipate, 18.5 parts (10 mole percent) of hexamethylenediammonium-m-phenylenedioxy diacetate and 45.9 parts (30 mole percent) of hexamethylenediammonium terephthalate dissolved in 89.0 parts of water was added to a stainless steel high pressure autoclave which had been previously purged with nitrogen. Polymerization was carried out by the procedure set forth in Example I. The melting point of the resulting polymer was approximately 264° C. and a monofilament yarn spun therefrom exhibited good textile properties.

Comparative tests were conducted to determine relative boiling water shrinkage in comparison to a conventional polyhexamethylene adipamide (nylon 66) yarn. The yarns were exposed to boiling water for a period of 5 minutes and their lengths were measured both before and after exposure. The percent boiling water shrinkage is determined by the following formula:

$$\frac{\text{length before exposure} - \text{length after exposure}}{\text{length before exposure}} \times 100$$

$$= \text{percent boiling water shrinkage}$$

The results obtained in this test are illustrated by the following table:

| Example: | Boiling water shrinkage, percent |
|---|---|
| I | 29.0 |
| II | 71.0 |
| III | 29.5 |
| IV | 18.5 |
| Nylon 66 (control) | 10.0 |

As can be seen from the above table, the yarns prepared from the terpolyamides obtained in accordance with the present invention exhibit a significant increase in boiling water shrinkage when compared to a yarn prepared from a conventional polyamide.

As many widely different embodiments of this invention may be made without departing from the spirit and scope thereof, it is to be understood that the invention is not to be limited by the specific embodiments set forth herein but only by the claims which follow.

I claim:

1. A linear fiber-forming terpolyamide composed of (A) 1 to 98 mole percent, based on the molecular weight of the terpolyamide, of units represented by the structure

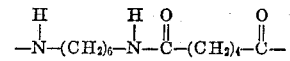

(B) 1 to 98 mole percent, based on the molecular weight of the terpolyamide, of units represented by the structure

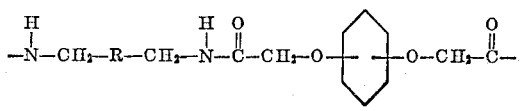

wherein R is a member of the group consisting of tetramethylene and 1,4-cyclohexylene, and (C) 1 to 50 mole percent, based on the molecular weight of the terpolyamide, of units represented by the structure

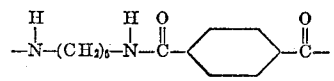

2. The linear fiber-forming terpolyamide as defined in claim 1 wherein R is tetramethylene.

3. The linear fiber-forming terpolyamide as described in claim 1 wherein R is 1,4-cyclohexylene.

4. A linear fiber-forming terpolyamide composed of (A) 30 to 60 mole percent, based on the molecular weight of the terpolyamide, of units represented by the structure

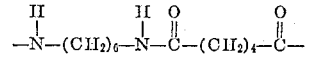

(B) 10 to 50 mole percent, based on the molecular weight of the terpolyamide of units represented by the structure

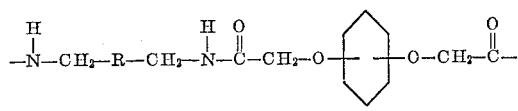

wherein R is a member selected from the group consisting of tetramethylene and 1,4-cyclohexylene, and (C) 20 to 50 mole percent, based on the molecular weight of the terpolyamide of units represented by the structure

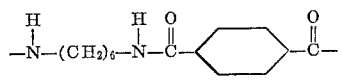

5. The linear fiber-forming terpolyamide as defined in claim 4 wherein R is tetramethylene.

6. The linear fiber-forming terpolyamide as defined in claim 4 wherein R is 1,4-cyclohexylene.

7. A textile fiber of the terpolyamide as defined in claim 1.

8. A textile fiber of the terpolyamide as defined in claim 4.

References Cited

UNITED STATES PATENTS

| | | | |
|---|---|---|---|
| 2,158,064 | 5/1939 | Carothers | 260—78 |
| 3,012,994 | 12/1961 | Smith et al. | 260—78 |

FOREIGN PATENTS 801,733   9/1958   Great Britain.

WILLIAM H. SHORT, *Primary Examiner.*

L. LEE, *Assistant Examiner.*